United States Patent
Lin et al.

(10) Patent No.: US 11,912,837 B2
(45) Date of Patent: Feb. 27, 2024

(54) THIN FILM, MANUFACTURING METHOD AND USES THEREOF

(71) Applicant: SAN FANG CHEMICAL INDUSTRY CO., LTD., Kaohsiung (TW)

(72) Inventors: Chih-Yi Lin, Kaohsiung (TW); Kuo-Kuang Cheng, Kaohsiung (TW); Chi-Chin Chiang, Kaohsiung (TW); Wen-Hsin Tai, Kaohsiung (TW); Ming-Chen Chang, Kaohsiung (TW)

(73) Assignee: SAN FANG CHEMICAL INDUSTRY CO., LTD., Kaohsiung (TW)

( * ) Notice: Subject to any disclaimer, the term of this patent is extended or adjusted under 35 U.S.C. 154(b) by 215 days.

(21) Appl. No.: 17/391,959

(22) Filed: Aug. 2, 2021

(65) Prior Publication Data

US 2022/0041820 A1 Feb. 10, 2022

(30) Foreign Application Priority Data

Aug. 7, 2020 (TW) .................................. 109126831

(51) Int. Cl.
| | | |
|---|---|---|
| *C08J 5/12* | (2006.01) | |
| *C08J 5/18* | (2006.01) | |
| *B32B 25/08* | (2006.01) | |
| *B32B 25/14* | (2006.01) | |
| *B29C 48/00* | (2019.01) | |
| *C08F 255/04* | (2006.01) | |
| *B29K 23/00* | (2006.01) | |
| *B29C 48/08* | (2019.01) | |
| *B29K 21/00* | (2006.01) | |
| *B29K 96/02* | (2006.01) | |

(52) U.S. Cl.
CPC ............ *C08J 5/121* (2013.01); *B29C 48/022* (2019.02); *B32B 25/08* (2013.01); *B32B 25/14* (2013.01); *C08F 255/04* (2013.01); *C08J 5/18* (2013.01); *B29C 48/0011* (2019.02); *B29C 48/08* (2019.02); *B29K 2021/003* (2013.01); *B29K 2023/06* (2013.01); *B29K 2023/12* (2013.01); *B29K 2096/02* (2013.01); *B29K 2995/007* (2013.01); *B29K 2995/0077* (2013.01); *B32B 2250/02* (2013.01); *B32B 2250/24* (2013.01); *C08J 2323/12* (2013.01); *C08J 2351/06* (2013.01); *C08J 2367/02* (2013.01); *C08J 2377/00* (2013.01)

(58) Field of Classification Search
CPC ... B29C 48/0011; B29C 48/022; B29C 48/08; B29K 2021/003; B29K 2023/06; B29K 2023/12; B29K 2096/02; B29K 2995/007; B29K 2995/0077; B32B 2250/02; B32B 2250/24; B32B 2270/00; B32B 2274/00; B32B 2405/00; B32B 25/08; B32B 25/14; B32B 27/08; B32B 27/32; B32B 27/34; B32B 27/36; C08F 255/04; C08J 2323/04; C08J 2323/10; C08J 2323/12; C08J 2351/06; C08J 2367/02; C08J 2377/00; C08J 2451/06; C08J 5/121; C08J 5/18; C08L 23/02; C08L 51/06; C09D 151/06

See application file for complete search history.

(56) References Cited

U.S. PATENT DOCUMENTS

| | | | |
|---|---|---|---|
| 6,670,035 B2 | 12/2003 | Pittman et al. | |
| 2020/0198197 A1* | 6/2020 | Kane | ..................... B32B 15/043 |

FOREIGN PATENT DOCUMENTS

| | | |
|---|---|---|
| CN | 101293977 A | 10/2008 |
| CN | 102317395 A | 1/2012 |
| CN | 103118872 A | 5/2013 |
| CN | 103450403 A | 12/2013 |
| CN | 109837040 A | 6/2019 |
| EP | 2896647 A1 | 7/2015 |
| JP | 2002201331 A | 7/2002 |
| TW | I296007 B | 4/2008 |
| TW | I299371 B | 8/2008 |
| TW | I438238 B | 5/2014 |
| TW | 201525059 A | 7/2015 |
| TW | M576595 U | 4/2019 |
| WO | WO2018208554 A1 | 11/2018 |

OTHER PUBLICATIONS

English Abstract of TWI296007B.
U.S. Pat. No. 6,670,035B2 Corresponds to TWI299371B.
English Abstract of TWM576595U.
Office Action with Search Report issued in the corresponding Taiwan application No. 109126831.
China Patent Office, Office Action dated Apr. 15, 2023, China.
China Patent Office, Search Report dated Apr. 15, 2023, China.

* cited by examiner

*Primary Examiner* — Frances Tischler
(74) *Attorney, Agent, or Firm* — WPAT, P.C

(57) ABSTRACT

The present disclosure provides a thin film including a first thermoplastic polyolefin (TPO) elastomer which is anhydride-grafted. The present disclosure further provides a method for manufacturing the thin film, a laminated material and a method for adhesion.

7 Claims, No Drawings

THIN FILM, MANUFACTURING METHOD AND USES THEREOF

BACKGROUND

1. Field of the Disclosure

The present disclosure relates to a composite material, and more particularly to a thin film, a manufacturing method thereof, and uses thereof.

2. Description of the Related Art

In the textile industry, it is important to firmly adhere different materials to prevent peeling of layers. Fabrics made of different materials, due to differences in polarity and surface processing, are especially resistant to adhesion. The difficulty is compounded when the layers constitute fine-porous fabrics with low surface tension.

In a conventional method, when adhering fabrics made of different materials, especially materials of different polarities, surface processing of one of the materials is conducted to enhance adhesion. The surface processing may include physical roughening of the surface or forming pores on the surface, or use of chemical treatment agents to increase surface polarity. The aforementioned surface processing increases not only manpower and costs, but suffers further from unevenness and poor reproducibility after processing.

In addition, as polyethylene terephthalate and nylon fabrics used in many garments in the market become lighter and thinner, the holes in the mesh become denser, making it difficult for ordinary adhesive to penetrate for adhesion purpose. Furthermore, such fabrics are often surface-processed for functional purposes such as calendaring, coating with water repellent or easy-to-clean agents, an others, increasing the difficulty of the aforementioned surface processing for enhancing adhesion. Polyolefin cannot properly adhere to materials which are surface processed for functional purpose or fabrics with low surface tension. Most polyurethanes and polyolefin hot melt adhesives cannot effectively form firm adhesion between the aforementioned materials.

In addition, the surface treating agents usually include chemical solvents or catalysts, and the corresponding adhesive layer may also contain components such as chlorine. These components can negatively impact the environment and present a danger to health and safety, creating multiple concerns for operators.

SUMMARY

Hence, the present disclosure provides a thin film for adhering two materials, in which there is no need to apply a surface treatment before adhesion. The adhesion process is simple and low cost and adhesion between the materials enhanced. In addition, there is no need to use unsafe and environmentally unfriendly materials.

The present disclosure provides a thin film including a first thermoplastic polyolefin (TPO) elastomer which is anhydride-grafted.

The present disclosure further provides a method for manufacturing the aforementioned thin film, including:
 (a) providing the first TPO elastomer which is anhydride-grafted; and
 (b) extruding the first TPO elastomer to form the thin film.

The present disclosure further provides a laminated material including a main layer and the aforementioned thin film directly contacting the main layer.

The present disclosure further provides a method for adhesion, including adhering the aforementioned thin film to a main layer by hot pressing.

DETAILED DESCRIPTION

The present disclosure provides a thin film including TPO elastomer which is anhydride-grafted.

The thin film of the present disclosure may be in the form of a sheet, film, or block, but is not limited thereto.

A material of the thin film of the present disclosure includes TPO, which may be anhydride-grafted, or not anhydride grafted. That is, in some embodiments, the thin film of the present disclosure includes a first TPO elastomer which is anhydride-grafted, and may optionally include a second TPO elastomer which is not anhydride-grafted. The TPO elastomer of the present disclosure (e.g., the first TPO elastomer and/or the second TPO elastomer) may be thermoplastic polyethylene, thermoplastic polypropylene, or a copolymer thereof. In another aspect, the anhydride may be, but is not limited to, maleic anhydride, succinic anhydride, phthalic anhydride, butyric anhydride, or acetic anhydride. Preferably, the anhydride is maleic anhydride. The type and quantity of the anhydride used for grafting the first TPO elastomer may be adjusted according to the required properties. In one preferred embodiment of the present disclosure, the thin film includes about 10% by weight to about 30% by weight of the first TPO elastomer; preferably about 15% to about 25%; and more preferably about 20%. In another aspect, a grafting ratio of the first TPO elastomer is about 0.2 mol/kg to about 4 mol/kg, and preferably about 1 mol/kg to about 2 mol/kg.

While not bound to any theory, it is believed that since the thin film of the present disclosure includes the first TPO elastomer which is anhydride-grafted, the anhydride functional group increases the polarity of the thin film. Hence, the thin film can provide the same adhesion strength without the need for surface processing. The thin film can properly adhere to any material and avoid problem of ineffective adhesion as encountered in conventional techniques.

In an embodiment of the present disclosure, the thin film may include other materials providing appropriate physical properties according to intended use, such as other polymers providing resistance to flame, poor conductivity, weather, heat, and impact. In a preferred embodiment of the present disclosure, the thin film may further comprise other elastic polymers. The type and quantity of such elastic polymers can be adjusted according to required properties. While not wishing to be bound by any theory, it is believed that the addition of other elastic polymers can provide the thin film with increased resilience, enhance its adhesion to materials with low surface tension, and improved molding effect of the thin film in consequent molding processes.

In a preferred embodiment of the present disclosure, the physical properties of the thin film are as follows.
 Hardness: Shore A about 60 to about 90
 Tensile strength: about 50 Kgf/cm$^2$ to about 250 Kgf/cm$^2$
 Elongation: about 600% to about 1200%
 300% modulus: about 20 Kgf/cm$^2$ to about 50 Kgf/cm$^2$
 Melting point: about 100° C. to about 180° C.

The present disclosure further provides a method for manufacturing the thin film, comprising:
 (a) providing the first TPO elastomer which is anhydride-grafted; and
 (b) extruding the first TPO elastomer to form the thin film.

In one embodiment of the present disclosure, the extrusion can utilize, but is not limited to, drying, melting, and extruding the anhydride-grafted first TPO elastomer using T-die, and then cooling the anhydride-grafted first TPO elastomer to form a film of a desired thickness. In one embodiment of the present disclosure, the anhydride-grafted first TPO may be pressed during extrusion, such as by calendar rollers, to control the thickness of the resultant film.

In a preferred embodiment of the present disclosure, step (a) may further include providing a second TPO elastomer which is not anhydride-grafted, and step (b) may include co-extruding the first TPO elastomer and the second TPO elastomer to form the thin film Similarly, the co-extrusion can utilize, but is not limited to, drying, melting, and co-extruding a mixture of the anhydride-grafted first TPO elastomer, the second TPO elastomer and other optional materials using T-die, and then cooling the mixture to form a film of a desired thickness. In one embodiment of the present disclosure, the mixture may be pressed during co-extrusion, such as by calendar rollers, to control the thickness of the resultant film.

The present disclosure further provides a laminated material, which includes a main layer and the aforementioned thin film directly contacting the main layer.

The laminated material of the present disclosure refers to a composite material of different material layers adhering to each other. The laminated material or the material layers may be in the form of a sheet, film, block, or hollow block, but are not limited thereto.

Preferably, in the laminated material of the present application, the main layer has an unroughened surface, and the thin film directly contacts the unroughened surface. That is, the surface of the main layer has not been roughened by any surface roughening process. In the present disclosure, the surface roughening process can be, but is not limited to, physical or chemical means for increasing the roughness of a surface, such as physically forming regular or irregular holes, grooves, and nicks on the surface, or chemically etching the surface. The term "roughness" in the present disclosure is quantified by the deviations in the direction of the normal vector of a real surface from its ideal form, and can be defined by the instruments or measurement specifications commonly used in the industry.

In one embodiment of the present disclosure, the thin film is preferably applied to the unroughened surface of the main layer by coating, transferring, printing, or scraping, such that the adhesive directly contacts the unroughened surface of the main layer and adheres to the main layer.

In one preferred embodiment of the present disclosure, the main may be made of a polymeric material. A material of the main layer may be selected from the group consisting of polyethylene terephthalate, nylon, and polypropylene.

The thin film of the present disclosure provides favorable adhesion. Hence, there is no need to apply a chemical surface treatment (e.g., primer) on the surface of the main layer. The main layer can directly contact the thin film. In comparison to the conventional method, the laminated material of the present disclosure can be formed through a simple manufacturing process at low cost, while the adhesion between the thin film and the main layer is enhanced. In addition, there is no need to use unsafe and environmentally unfriendly materials.

The present disclosure further provides a method for adhesion, including adhering the aforementioned thin film to a main layer by hot pressing.

The hot pressing process of the present disclosure may include heating the thin film according to the melting point of the material of the thin film until the thin film is melted or partially melted. Preferably, a clamp is used to assist the process.

The following examples, given to illustrate the present disclosure, are not intended to limit the scope thereof.

EXAMPLE 1

Drying condition: A mixture of about 90% of TPO elastomer and about 10% of maleic anhydride-grafted polyolefin was dried at 90° C. to a moisture content of about 300 ppm or lower.

Extruder temperature: 170° C., 205° C., 200° C.

Tube temperature: 200° C., 195° C., 195° C.

The temperature of the T-die was set at 190° C.

The mixture was extruded and passed through calendar rollers for cooling. The speed of the calendar rollers was set at 8.0 m/min, thus forming a film having a total thickness of about 0.1 mm The film was cured for 1 to 2 days to obtain the thin film.

EXAMPLE 2

Drying condition: A mixture of about 80% of TPO elastomer and about 20% of maleic anhydride-grafted polyolefin was dried at 90° C. to a moisture content of about 300 ppm or lower.

Extruder temperature: 170° C., 205° C., 200° C.

Tube temperature: 200° C., 195° C., 195° C.

The temperature of the T-die was set at 190° C.

The mixture was extruded and passed through calendar rollers for cooling. The speed of the calendar rollers was set at 8.0 m/min, thus forming a film having a total thickness of about 0.1 mm The film was cured for 1 to 2 days to obtain the thin film.

EXAMPLE 3

Drying condition: A mixture of about 70% of TPO elastomer and about 30% of maleic anhydride-grafted polyolefin was dried at 90° C. to a moisture content of about 300 ppm or lower.

Extruder temperature: 170° C., 205° C., 200° C.

Tube temperature: 200° C., 195° C., 195° C.

The temperature of the T-die was set at 190° C.

The mixture was extruded and passed through calendar rollers for cooling. The speed of the calendar rollers was set at 8.0 m/min, thus forming a film having a total thickness of about 0.1 mm. The film was cured for 1 to 2 days to obtain the thin film.

A comparison between the physical properties of the thin film of Examples 1 and 2 (including the anhydride-grafted TPO elastomer) and an unmodified thin film (not including the anhydride-grafted TPO elastomer), is listed as follows.

TABLE 1

|  | Direction | Tensile Strengh (Kgf/cm$^2$) | Elongation at break (%) | 300% stress (Kgf/cm$^2$) | Tm (° C.) |
|---|---|---|---|---|---|
| Unmodified | MD | 109.1 | 1069 | 24.3 | 105 |
|  | CD | 110.3 | 1080 | 21.1 |  |
| Example 1 | MD | 111.9 | 839 | 30.2 | 162 |
|  | CD | 97.3 | 785 | 31.4 |  |

TABLE 1-continued

| | Direction | Tensile Strength (Kgf/cm$^2$) | Elongation at break (%) | 300% stress (Kgf/cm$^2$) | Tm (° C.) |
|---|---|---|---|---|---|
| Example 2 | MD | 105.2 | 809 | 28.1 | 160 |
| | CD | 90.4 | 931 | 27.3 | |

The thin film is adhered to a polyethylene terephthalate by hot pressing, under process conditions of test piece size: 25 mm×150 mm, clamp distance: 75 mm, speed: 500 mm/min, with maximum strength recorded as in Table 2 as follows.

TABLE 2

| | Unmodified | Example 1 | Example 2 |
|---|---|---|---|
| 170° C. Peeling strength (N/mm) | 0.1 | 0.73 | 1.31 |
| | 0.13 | 0.65 | 1.24 |
| 180° C. Peeling strength (N/mm) | 0.12 | 0.78 | 1.28 |
| | 0.08 | 0.76 | 1.39 |

The thin film is sandwiched between two fabrics (in the same direction) and then hot-pressed. The test piece is cut to a size of 2.5 cm×20 cm, and the peel strength tested with a tensile machine. After installing the test piece on the tensile machine, the clamp moves until the displacement of the clamp reaches 100 mm The maximum force during the aforementioned process is recorded (in N), and divided by a width of 25 mm to obtain the test result in N/mm. The clamp distance is 50 mm, and moving speed is 305 mm/min The results are shown in Table 3 as follows.

TABLE 3

| | Unmodified | Example 1 | Example 2 |
|---|---|---|---|
| 170° C. Peeling strength (N/mm) | 0.07 | 0.65 | 1.2 |
| | 0.12 | 0.76 | 1.32 |
| 180° C. Peeling strength (N/mm) | 0.13 | 0.78 | 1.27 |
| | 0.04 | 0.74 | 1.38 |

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not necessarily be drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt to a particular situation, material, composition of matter, method, or process in accordance with the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. A laminated material, comprising:
a main layer, which is a porous fabric; and
a film directly contacting the main layer, wherein the film comprises about 10% by weight to about 20% by weight of a first thermoplastic polyolefin (TPO) elastomer which is anhydride-grafted, and a grafting ratio of the first TPO elastomer is about 0.2 mol/kg to about 4 mol/kg.

2. The laminated material of claim 1, wherein the main layer has an unroughened surface, and the film directly contacts the unroughened surface of the main layer.

3. The laminated material of claim 2, wherein a material of the main layer is selected from the group consisting of polyethylene terephthalate, nylon, and polypropylene.

4. The laminated material of claim 2, wherein the first TPO elastomer is thermoplastic polyethylene, thermoplastic polypropylene or a copolymer thereof.

5. The laminated material of claim 2, wherein the first TPO elastomer is grafted by an anhydride selected from the group consisting of maleic anhydride, succinic anhydride, phthalic anhydride, butyric anhydride and acetic anhydride.

6. The laminated material of claim 2, wherein the film further comprises a second TPO elastomer which is not anhydride-grafted.

7. The laminated material of claim 6, wherein the second TPO elastomer is thermoplastic polyethylene, thermoplastic polypropylene or a copolymer thereof.

\* \* \* \* \*